Figure 1:
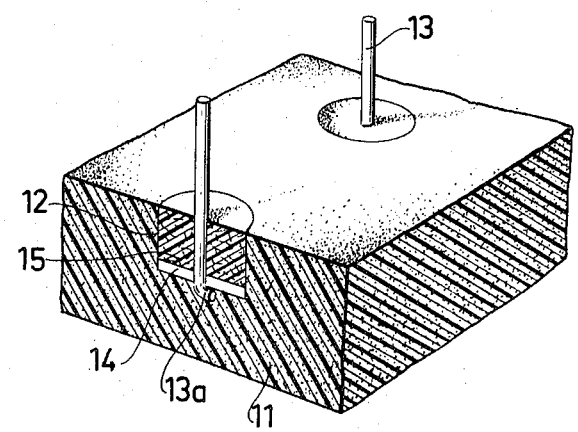

United States Patent

Mattsson et al.

[15] 3,650,878

[45] Mar. 21, 1972

[54] METHOD FOR ANCHORING FASTENERS IN CELLULAR PLASTIC MATERIALS AND JOINTS OBTAINED THEREBY

[72] Inventors: Erik Harry Mattsson, Tidaholm; Hans Ulrich Wurth, Ekedalen, both of Sweden

[73] Assignee: Bofors-Tidaholmsverken Aktiebolag, Tidaholm, Sweden

[22] Filed: Oct. 8, 1968

[21] Appl. No.: 765,903

[30] Foreign Application Priority Data

Oct. 12, 1967 Sweden..............................13972/67

[52] U.S. Cl..............................................161/48, 156/293
[51] Int. Cl........................................................B32b 33/00
[58] Field of Search.....................................156/293; 161/48

[56] References Cited

UNITED STATES PATENTS

| 773,306 | 10/1904 | Wadsworth | 161/48 |
| 2,164,244 | 6/1939 | Jung | 156/293 |
| 2,511,168 | 6/1950 | Martin et al. | 156/293 |
| 2,760,898 | 8/1956 | Voelker | 156/293 |
| 2,898,258 | 8/1959 | Meier et al. | 156/293 |
| 3,414,305 | 12/1968 | Minogue | 156/293 |
| 3,444,018 | 5/1969 | Hewitt | 156/293 |

FOREIGN PATENTS OR APPLICATIONS 1,048,686  9/1964  Great Britain..........................161/48

*Primary Examiner*—Reuben Epstein
*Attorney*—Hane & Baxley

[57] ABSTRACT

A strong direct joint between a fastener element and a block of cellular plastic material is obtained by providing a wide contact surface between the element and the block and then providing a layer of hardenable plastic material in the space between the element and the block.

1 Claims, 4 Drawing Figures

INVENTORS
ERIK HARRY MATTSSON
HANS ULRICH WÜRTH
BY Hane and Baxley
ATTORNEYS

INVENTORS
ERIK HARRY MATTSSON
HANS ULRICH WÜRTH

BY Hane and Baxley
ATTORNEYS

METHOD FOR ANCHORING FASTENERS IN CELLULAR PLASTIC MATERIALS AND JOINTS OBTAINED THEREBY

The present invention is concerned with a method for anchoring fasteners direct in cellular plastic materials and joints obtained when applying the method.

In many instances cellular plastics are used in a sandwich-like construction in which a sheet of cellular plastic material is sandwiched between sheets of surface material and a frame work is placed around the edges. In constructions such as these it is a relatively simple matter to secure fastener or anchoring elements etc. to the surface material or the edge strips.

In a large number of cases the surface material is actually unnecessary, although the possibility of securing fastener elements to or in the plastic material is still desired. The arrangement of such attachment or anchoring points has hitherto been accompanied with certain difficulties since the ability of the plastic to permit fastening or anchoring by normal devices, such as screws, is poor.

The object of the present invention is to resolve the aforementioned problem and provide a strong joint between fastener elements and cellular plastics. This object is achieved by means of the present invention which is mainly characterized in that the portion of the fastener element which is to be connected to the cellular plastic is provided with a wide abutment surface and may optionally also be provided completely or partially with a surrounding layer of a curable plastic which may contain mineral fibers, such as glass fibers, that said fastener portion is inserted in an intended opening in the cellular plastic and that optionally additional curable plastic is applied, to fill out the opening, and the plastic allowed to harden. Other characterizing features of the invention will be apparent from the following description.

The joint or anchorage obtained when applying the aforedescribed method is in the majority of cases so strong that when subjected to tensile tests it withstands such high loads that fracture occurs in the actual body of the cellular material and not at the interface between the anchored element and cellular material.

This is due to the fact that the surface between the fastener element and the cellular material has been given large dimensions and can therefore transfer relatively large forces. If in addition a reinforced thermosetting resin, e.g., a glass-fiber reinforced polyester is also used in joining the fastener element and cellular plastic material the joint resulting from this combination is very strong indeed, particularly if the fastener element has been given a rough or perforated surface, since the glass fibers engage in the pores of the cellular material and in the irregularities or holes in the fastener element and, generally speaking, bind said element in position.

The joint obtained when applying the method according to the invention presents an additional important advantage, namely that cold bridges are avoided. If a conventional metal fastener element is used, which passes completely through the block of cellular plastic the element conducts cold from one side of the block to the other and gives rise to so-called cold bridges. This cannot occur in the case of the joint according to the invention since the fastener elements do not pass right through the material, but terminate within the block.

Figure 2:
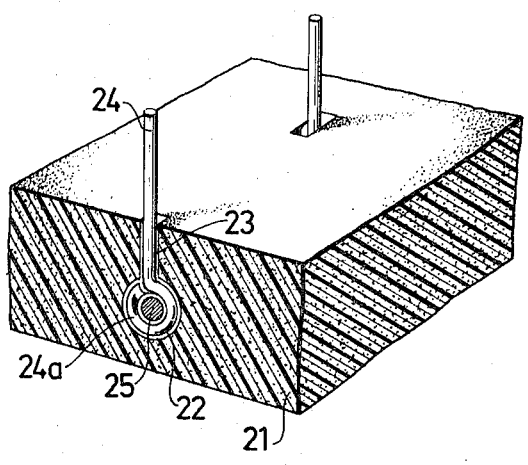
Figure 3:
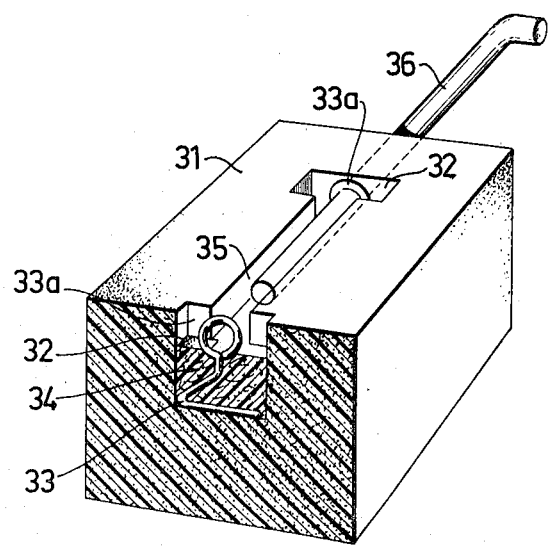
Figure 4:
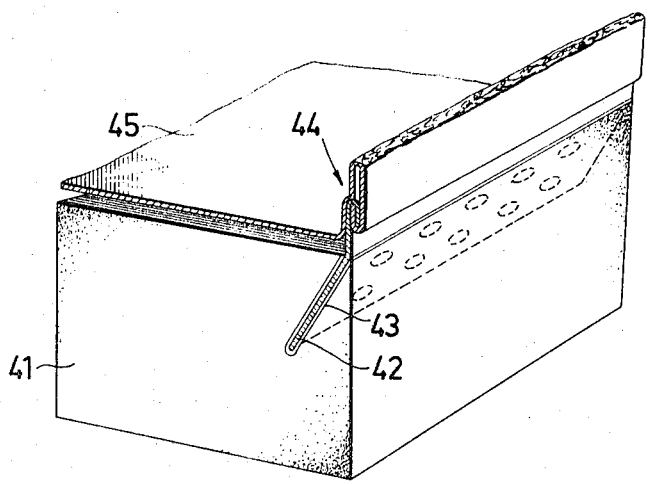

The invention will now be described with reference to the drawings, which show a number of illustrative embodiments and in which, FIG. 1 shows a joint in which an anchor or mounting plug is used, FIG. 2 shows a joint in which an anchor ring and anchor pin are used, FIG. 3 shows a joint in which an anchor is used, and FIG. 4 shows a joint in which a perforated plate is used.

FIG. 1 shows a block of cellular plastic material 11 provided with a cylindrical recess 12. Inserted in the recess is a peg or the like 13, in the form of a reinforcement bar, so-called deformed bars, presenting a bent inner end 13a, a perforated securing plate 14, e.g., made of plywood, resting on said end 13a, and uppermost a cellular plastic plug 15 which in the illustrative example has a hole arranged in the center thereof. The securing plate 14 and the plug 15 have essentially the same diameter as the recess and the plug is preferably made of the same material as the plastic in which it is inserted.

When effecting the joint the pin and the securing plate are inserted in the recess first, whereafter a certain amount of liquid curable resin, e.g., polyester, which may also contain glass fibers, is introduced into the recess, and finally the plug, whereupon the resin in the recess is forced up along the sides of the plug and through the hole disposed therein so that all surfaces between the fastener element and the cellular plastic become coated with binding agent. When the polyester is cured throughout a flat anchoring surface is obtained, which is so large that it is possible to transfer relatively large forces to the pin therethrough.

A joint of this nature in which the cellular plastic was a urethane cellular plastic having a density of 30 g./l., Bonocell 30, the diameter and height of the plug 60 mm. and the thickness of the securing plate, which was made of plywood, 5 mm., was subjected to a tensile test. Fracture occurred at a load of 225 kg., although in the cellular plastic body itself and not in the joint.

FIG. 2 shows a block of cellular plastic 21 provided with a larger recess 22 extending parallel with the main surface of the cellular plastic and a hole 23 disposed perpendicular to the recess and opening out into said larger recess. A pin 24 provided with an eye or ring portion 24a is inserted in the hole and recess at right angles to the surface of the cellular plastic and locked by means of a locking pin 25 passed into the larger hole through the eye portion 24a of the pin 24. The load on the pin 24 is distributed in this way over a relatively large cylindrical surface.

A joint of this nature, in which the locking pin was placed 50 mm. below the surface of the cellular plastic (Bonocell 30); was 200 mm. long and had a diameter of 28 mm. was subjected to a tensile test, whereupon fracture occurred in the cellular plastic itself at a load of 210 kg.

In FIG. 3 is shown a block 31 of cellular plastic provided with recesses 32. In each recess 32 is placed a pin bolt 33 which presents a suitably curved or bent portion, a so-called anchor bolt, and which is inserted at right angles to the surface of the cellular plastic block. The bent portion is grouted in the glass-fiber reinforced polyester, whereby an anchoring surface of such magnitude is obtained that resulting loads are readily transmitted. In this embodiment the pin 33 is provided with an oval anchor eye 33a at its outer end, the eye being completely sunk into the cellular plastic and capable of cooperating when securing the cellular plastic block with a pin 36 accommodated in a groove 35 in the surface of said block.

A joint of this nature, in which the anchor bolt was grouted in with glass-fiber reinforced polyester at a depth of 50 mm. and a 70 mm. wide recess in the block (Bonocell 30) was subjected to a tensile test. The length of the bent portion of the anchor bolt was equal to the width of the recess, Fracture occurred at a load of 135 kg., although in the actual block itself and not at contact surface of the attachment and the cellular plastic.

This type of anchored fastener is suitable for use, when mounting blocks of cellular insulating material, for instance, in seagoing vessels, wherewith eye bolts are welded to the sides and bulk heads of the vessel at distances apart which correspond to the spacing of the attachment eyes in the cellular plastic blocks. When mounting the blocks in position the attachment eyes are placed opposite the eyes welded to the ship sides and bulkheads and, by passing securing pins along the groove in the surface of the block and through the eyes, can be locked together. In this way prefabricated blocks can be erected or mounted without creating in the erected insulation the possibility of cold bridges across metal objects used in conjunction therewith.

If it is desired to attach a second insulating layer over the first layer the type of attachment shown in FIG. 1 can be used, by simply drilling holes in the first and second insulating layers and then joining said layers in the manner described in connection with this type of attachment joint.

In FIG. 4 is shown a block 41 of cellular plastic which is provided with a fastener element inserted obliquely into the blocks. The element in this embodiment is in the form of a perforated plate 42 surrounded by a bonding layer 43 of glass-reinforced polyester, whereby the holes in the plate serve to achieve certain riveting effect.

In some instances it is desirable to provide the cellular plastic material with an outer covering of sheet metal. For this purpose the grouted plate element 42 can be provided at its free end with a fold, as shown in FIG. 4, which enters an interlocking fold arrangement 44 to attach a plate 45 to the cellular plastic block.

This type of attachment means was also subjected to a tensile test, although in the instance the perforated plate was inserted perpendicular to the surface of the cellular plastic to a depth of 50 mm. The plate was 100 mm. wide and the perforations 20 mm. in diameter and spaced apart at a distance of 20 mm. from their respective centers. The cellular plastic material was Bonocell 30 and the binding agent glass-fiber reinforced polyester.

Fracture due to failure of the cellular plastic occurred at a load of 125 kg.

Good results are also obtained if, in the case of loads concentrated over isolated areas (spot loading), fastener elements in the form of helical springs are used, for instance, or in the case of loading along a line elements in the form of, for instance, expanded metal.

We claim:

1. An assemblage for securing a fastener element in a mounting block, said assemblage comprising:
   a block of cellular plastic material having a recess in one of its sides;
   a fastener element in the form of a pin with a rough surface and bent off at one end, said bent-off pin end being inserted into said recess of the block;
   a perforated plate on said pin and abutting the bent pin end; and
   a perforated cellular plastic plug in said recess filling the same, said plug encompassing the pin and its base abutting against said plate, said plug being made of the same cellular plastic material as said block.

* * * * *